US011188799B2

(12) United States Patent
Kojima

(10) Patent No.: US 11,188,799 B2
(45) Date of Patent: Nov. 30, 2021

(54) SEMANTIC SEGMENTATION WITH SOFT CROSS-ENTROPY LOSS

(71) Applicant: SONY CORPORATION, Tokyo (JP)

(72) Inventor: Tamaki Kojima, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 83 days.

(21) Appl. No.: 16/572,742

(22) Filed: Sep. 17, 2019

(65) Prior Publication Data

US 2020/0151497 A1     May 14, 2020

Related U.S. Application Data

(60) Provisional application No. 62/758,781, filed on Nov. 12, 2018.

(51) Int. Cl.
*G06K 9/62*     (2006.01)
*G06K 9/72*     (2006.01)
*G06K 9/46*     (2006.01)

(52) U.S. Cl.
CPC .......... *G06K 9/628* (2013.01); *G06K 9/4652* (2013.01); *G06K 9/6256* (2013.01); *G06K 9/726* (2013.01)

(58) Field of Classification Search
CPC ............ G06K 9/00718; G06K 9/3233; G06K 9/4652; G06K 9/6256; G06K 9/628; G06K 9/726; G06T 2207/10024; G06T 2207/20081; G06T 2207/20084; G06T 7/11
See application file for complete search history.

(56) References Cited

U.S. PATENT DOCUMENTS 9,916,522 B2   3/2018   Ros Sanchez et al.
10,304,193 B1 *   5/2019   Wang .................... G06T 7/0012
2018/0253622 A1   9/2018   Chen et al.
(Continued)

FOREIGN PATENT DOCUMENTS

CN     108062756 A     5/2018

OTHER PUBLICATIONS

Poudel, et al., "ContextNet: Exploring Context and Detail for Semantic Segmentation in Real-time", Conference paper at British Machine Vision Conference (BMVC), 2018, Nov. 5, 2018, pp. 1-12.
(Continued)

*Primary Examiner* — Ian L Lemieux
(74) *Attorney, Agent, or Firm* — Chip Law Group

(57) ABSTRACT

A system and method for semantic segmentation with a soft cross-entropy loss is provided. The system inputs a first color image to an input layer of a semantic segmentation network for a multi-class classification task. The semantic segmentation network generates, at an auxiliary stride, a first feature map as an output of an auxiliary layer of the semantic segmentation network based on the input first color image. The system extracts the generated first feature map from the auxiliary layer and computes a probability map as a set of soft labels over a set of classes of the multi-class classification task, based on the extracted first feature map. The system further computes an auxiliary cross-entropy loss between the computed probability map and a ground truth probability map for the auxiliary stride and trains the semantic segmentation network for the multi-class classification task based on the computed auxiliary cross-entropy loss.

18 Claims, 8 Drawing Sheets

(56) References Cited

U.S. PATENT DOCUMENTS

| | | | |
|---|---|---|---|
| 2018/0260957 A1* | 9/2018 | Yang | G06T 7/0012 |
| 2019/0122073 A1* | 4/2019 | Ozdemir | A61B 6/5217 |
| 2019/0172223 A1* | 6/2019 | Vajda | G06K 9/4633 |
| 2020/0020102 A1* | 1/2020 | Dai | G06K 9/6267 |
| 2020/0126236 A1* | 4/2020 | Rister | G06K 9/6257 |
| 2020/0160547 A1* | 5/2020 | Liu | G06K 9/6211 |
| 2020/0364507 A1* | 11/2020 | Berry | G06K 9/6262 |
| 2020/0410687 A1* | 12/2020 | Siemionow | G06F 3/0484 |
| 2021/0004611 A1* | 1/2021 | Garimella | G08G 1/0145 |

OTHER PUBLICATIONS

Yang, et al., "Convolutional Neural Networks with Alternately Updated Clique", Computer Vision and Pattern Recognition, arXiv:1802.10419, Apr. 3, 2018, 10 pages.

Liu, et al., "ERN: Edge Loss Reinforced Semantic Segmentation Network for Remote Sensing Images", Remote Sensing, vol. 10, Aug. 22, 2018, pp. 1-23.

Yu, et al., "BiSeNet: Bilateral Segmentation Network for Real-time Semantic Segmentation", Cornell University Library, 201 Olin Library Cornell University Ithaca, New York, Aug. 2, 2018, 18 pages.

Jegou, et al., "The One Hundred Layers Tiramisu: Fully Convolutional DenseNets for Semantic Segmentation", 2017 IEEE Conference on Computer Vision and Pattern Recognition Workshops, Jul. 2017, pp. 1175-1183.

Ronneberger, et al., "U-Net: Convolutional Networks for Biomedical Image Segmentation", Cornell University Library, 201 Olin Library Cornell University Ithaca, New York, May 2015, 08 pages.

Cui, et al., "Deep Convolutional Encoder-Decoder Architecture for Neuronal Structure Segmentation", 2018 International Conference on Control, Artificial Intelligence, Robotics & Optimization (ICCAIRO), May 2018, pp. 242-247.

International Search Report and Written Opinion of PCT Application No. PCT/IB2019/058664, dated Dec. 13, 2019, 11 pages.

* cited by examiner

SEMANTIC SEGMENTATION WITH SOFT CROSS-ENTROPY LOSS

CROSS-REFERENCE TO RELATED APPLICATIONS/INCORPORATION BY REFERENCE

This application claims priority to U.S. Provisional Patent Application Ser. No. 62/758,781 filed on Nov. 12, 2018, the entire content of which is hereby incorporated herein by reference.

FIELD

Various embodiments of the disclosure relate to machine learning and computer vision. More specifically, various embodiments of the disclosure relate to a system and method for semantic segmentation with a soft cross-entropy loss.

BACKGROUND

Semantic segmentation is one of the key components of scene understanding, a task where semantic labels are assigned to individual pixels. Application areas are broad with autonomous mobile agents, such as self-driving cars, drones, and entertainment robots, and augmented reality devices and surveillance. These application areas require efficient inference speed and capability of handling high resolution images. Recent advancements in semantic segmentation has shown significant progress in visual perception tasks. However, it is still a challenge to obtain an efficient all-in-one model that can run-on high-resolution images in resource-constrained computing environments, especially mobile ones which operate with a limited memory and computing resources. In order to obtain a desired level of classification accuracy on high resolution images, conventional models for semantic segmentation create large parameter sizes and occupy significantly large memory during training time, which is less useful for a mobile training environment, like an autonomous vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for semantic segmentation with a soft cross-entropy loss is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for semantic segmentation with a soft cross-entropy loss. Exemplary aspects of the disclosure provide a system that trains a semantic segmentation network to be suitable for real-time inference, while maintaining a balance between a classification accuracy and compactness of the sematic segmentation network. The disclosed system makes use of a soft cross-entropy (CE) loss as auxiliary loss to regularize the training of the semantic segmentation network and to reduce a memory usage during training time. In contrast with conventional hard label assignment for classification tasks, the disclosed system generates soft-assigned labels as a probability distribution on each auxiliary stride and applies cross entropy on soft target as an auxiliary loss function. Here, the soft assignment may be different from a typical hard assignment, where one of the binary values (0 or 1) are assigned to each value of the feature map. In soft assignment, each soft-assigned label is a floating point value between 0 and 1 and encodes class-probability for a respective value of the feature map. All the soft-assigned labels may be referred to as a probability map or a probability distribution over the set of classes of the multi-class classification task.

With the use of soft CE loss as the auxiliary loss, memory usage may be drastically reduced for gradient computations during training time. Since, the soft CE auxiliary loss saves memory, even high-resolution images can be provided as input for the training of the semantic segmentation network. This may help to obtain high-resolution semantically segmented images, especially when conventional methods try to crop input images to keep a balance between batch size and memory space. The use of soft CE loss may avoid a need to scale up score maps which may be required to store gradients in high resolution space and thereby, may ensure a light memory usage with a greater availability of number of auxiliary loss strides. Additionally, the use of soft CE loss may avoid a need to down-sample labels to the auxiliary stride with nearest-neighbor, and thereby may prevent a loss of semantic context information. The lightweight training of the semantic segmentation network may result in an all-inone model, capable of running on high resolution image inputs and suitable for real-time inference and multi-class classification tasks, especially panoptic segmentation tasks which combine semantic segmentation and instance segmentation together.

Figure 1:
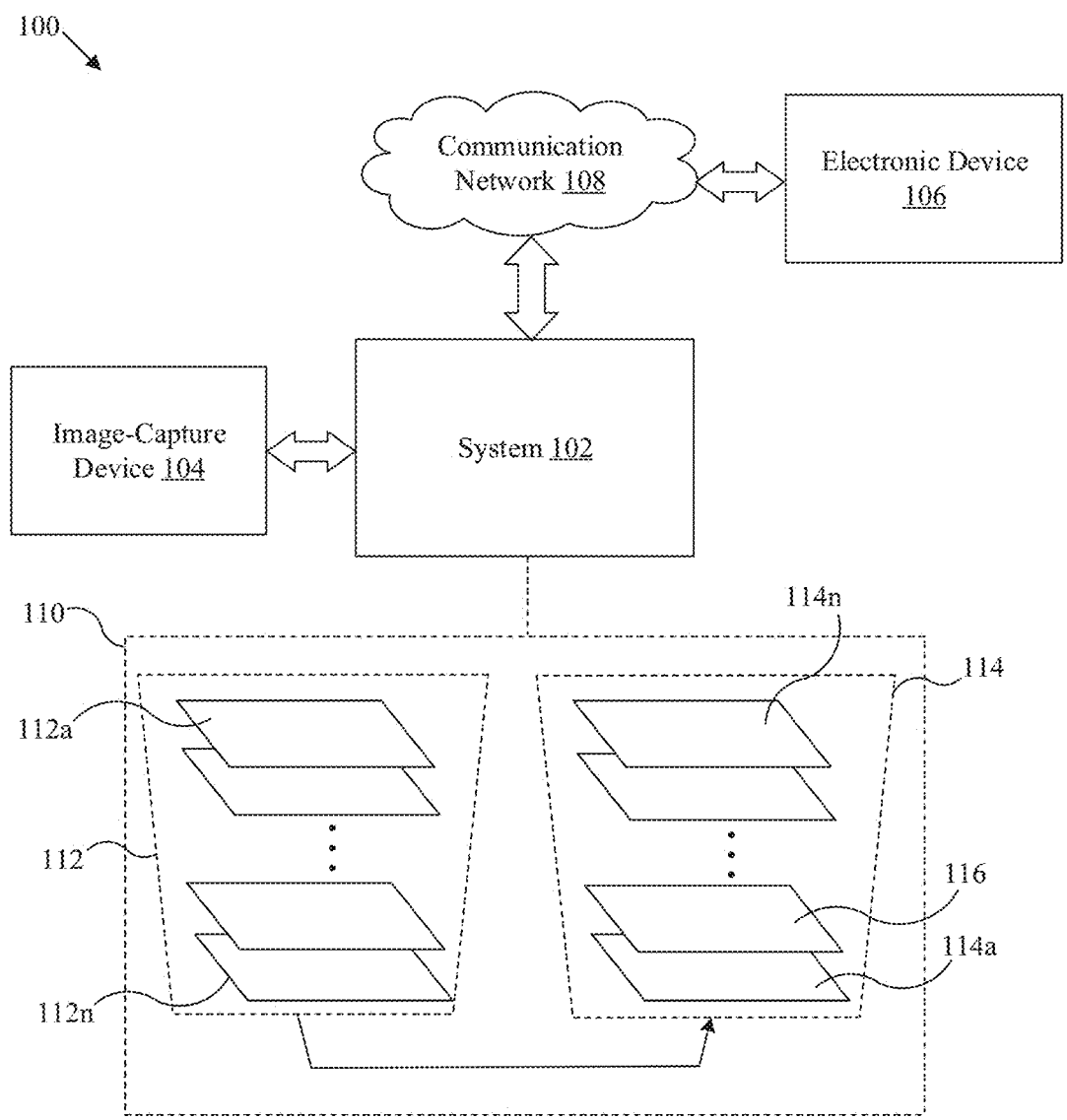
FIG. 1 is a diagram that illustrates an environment for semantic segmentation of input image frames, in accordance with an embodiment of the disclosure.

FIG. 1 is a diagram that illustrates an environment for semantic segmentation of input image frames, in accordance with an embodiment of the disclosure. With reference to FIG. 1, there is shown an environment 100. The environment 100 includes a system 102, an image-capture device 104, an electronic device 106, and a communication network 108. The system 102 may be communicatively coupled to the image-capture device 104 and the electronic device 106, via the communication network 108. The system 102 may include a semantic segmentation network 110, for example, as part of an application stored in memory of the system 102.

The system 102 may include suitable logic, circuitry, interfaces, and/or code that may be configured to train the semantic segmentation network 110 for a multi-class classification task. Once trained, the semantic segmentation network 110 may classify each pixel of an input image frame into a class of a set of classes of the multi-class classification task. Additionally, the semantic segmentation network 110, once trained, may be deployable for applications which may require semantically segmented image frames to take actions or generate real-time or near real-time inferences. By way of example, the system 102 may be implemented as a plurality of distributed cloud-based resources by use of several technologies that are well known to those skilled in the art. Other examples of implementation of the system 102 may include, but are not limited to, an in-vehicle Electronic Control-Unit (ECU), an in-vehicle server, a web/cloud server, an application server, a media server, a Consumer Electronic (CE) device, a camera, and a vehicle.

The image-capture device 104 may include suitable logic, circuitry, interfaces, and/or code that may be configured to capture a sequence of color image frames of a field-of-view (FOV) region of the image-capture device 104. The captured sequence of color image frames may be used, for example, to train the semantic segmentation network 110, or as an input to the trained semantic segmentation network 110 in a test environment (e.g., for benchmarking) or in an application-specific deployment, e.g., applications related to self-driving vehicles.

By way of example, and not limitation, the image-capture device 104 may have suitable optical instruments, such as lenses and actuators for the lenses, to focus on a scene and/or objects-of-interest in the scene. Examples of implementation of the image-capture device 104 may include, but are not limited to, a digital camera, a vehicle camera, a video cam, a Digital Single-Lens Reflex (DSLR) camera, professional video cameras, and dash cams. Although in FIG. 1, the system 102 and the image-capture device 104 are shown as two separate entities, this disclosure is not so limited. Accordingly, in some embodiments, the entire functionality of the image-capture device 104 may be included in the system 102, without a deviation from scope of the disclosure.

The electronic device 106 may include suitable logic, circuitry, interfaces, and/or code that may be configured to deploy the semantic segmentation network 110, as part of an application engine that may use the output of the semantic segmentation network 110 to generate real or near-real time inferences, take decisions, or output prediction results. The semantic segmentation network 110 may be deployed on the electronic device 106 once the semantic segmentation network 110 is trained on the system 102 for the multi-class classification task.

The functionalities of the electronic device 106 may be implemented in portable devices, such as a high-speed computing device, or a camera, and/or non-portable devices, such as a server. Examples of the electronic device 106 may include, but are not limited to, an in-vehicle ECU, a vehicle camera, a digital camera, a digital camcorder, a camera phone, a smart phone, a virtual reality device, a gaming console, a mobile device, or a hardware video player. Other examples of the electronic device 106 may include, but are not limited to a television, a home entertainment system, an augmented reality device, and a smart wearable (such as a smart glass).

The communication network 108 may include a communication medium through which the system 102, the image-capture device 104, and the electronic device 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The semantic segmentation network 110 may be a multi-stage Neural Network (NN) with an encoder-decoder architecture. The semantic segmentation network 110 may include an encoder network 112. The encoder network 112 may include a plurality of NN layers 112a . . . 112n that may encode spatial and semantic context information of a scene in an input color image into a feature map. The encoder network 112 may receive the input color image at an initial stride and may output a feature map at a first stride which may be a multiple of the initial stride. Herein, the stride may refer to the output stride, which represents a ratio of a size of the feature map with respect to a size of the input color image. For example, an input color image with a resolution of 1024×1024 pixels is provided at an initial stride of 1 to the encoder network 112. At a stride of 32, the encoder network 112 may output a feature map for the input color image. The feature map may encode the spatial and semantic context information in input color image. At the stride of 32, the size of the feature map may be 1/32 (i.e. 1/32) of the size of the input color image.

The semantic segmentation network 110 may further include a decoder network 114 which may be connected to an output 112n of the encoder network 112. The decoder network 114 may receive the feature map from the output 112n of the encoder network 112 as input at the first stride and may output a final score map back at the initial stride. Specifically, the decoder network 114 may up-sample the feature map back to the initial stride so that the size of the final score map is same as that of the input color image. At that point, each pixel in the input color image corresponds to a score value in the final score map. The decoder network 114 may include a plurality of NN layers 114a . . . 114n that may decode the output feature map to output the final score map. The final score map may include a score for each pixel of the input color image based on different classes of the multi-class classification task.

The semantic segmentation network 110 may be referred to as a computational network or a system of artificial neurons, where each NN layer of the semantic segmentation network 110 includes artificial neurons as nodes. Outputs of all the nodes in the semantic segmentation network 110 may be coupled to at least one node of preceding or succeeding NN layer(s) of the semantic segmentation network 110. Similarly, inputs of all the nodes in the semantic segmentation network 110 may be coupled to at least one node of preceding or succeeding NN layer(s) of the semantic segmentation network 110. Node(s) in a final layer of the semantic segmentation network 110 may receive inputs from at least one previous layer. A number of NN layers and a number of nodes in each NN layer may be determined from hyper-parameters of the semantic segmentation network 110. Such hyper-parameters may be set before or while training the semantic segmentation network 110 on a training dataset of color image frames.

Each node in the semantic segmentation network 110 may correspond to a mathematical function with a set of parameters, tunable while the semantic segmentation network 110 is trained. These parameters may include, for example, a weight parameter, a regularization parameter, and the like. Each node may use the mathematical function to compute an output based on one or more inputs from nodes in other layer(s) (e.g., previous layer(s)) of the semantic segmentation network 110.

The semantic segmentation network 110 may include electronic data, such as, for example, a software program, code of the software program, libraries, applications, scripts, or other logic/instructions for execution by a processing device, such as the system 102 and the electronic device 106. Additionally, or alternatively, the semantic segmentation network 110 may be implemented using hardware, such as a processor, a microprocessor (e.g., to perform or control performance of one or more operations), a field-programmable gate array (FPGA), or an application-specific integrated circuit (ASIC). In some embodiments, the semantic segmentation network 110 may be implemented using a combination of both the hardware and the software program.

In operation, a process may be initialized to train the semantic segmentation network 110 on a multi-class classification task, for example, semantic or panoptic image segmentation. In training of the semantic segmentation network 110, one or more of the set of parameters for each node of the semantic segmentation network 110 may be updated. Example of some training methods may include, but are not limited to, gradient descent, stochastic gradient descent, batch gradient descent, gradient boost, Adam, and meta-heuristics.

As part of the process, the system 102 may input a first color image to an input layer 112a of the semantic segmentation network 110. By way of example, the semantic segmentation network 110 may be trained to understand a complex semantic structure of a scene for an autonomous vehicle control in different complex situations. One of the complex situations may be related to a task to find a drivable area on the road, or to differentiate among sidewalks, terrain, obstacles, other cars, walls, poles, and the like.

The semantic segmentation network 110 may include, for example, separate paths to extract spatial information and semantic context information from the input first color image. Both the spatial information and the context information may be later fused before a final score map is generated by the semantic segmentation network 110. At an auxiliary stride, based on the input first color image, the semantic segmentation network 110 may generate a first feature map as an output of an auxiliary layer 116 of the semantic segmentation network 110. The system 102 may then extract the generated first feature map from the auxiliary layer 116 and based on the extracted first feature map, compute a probability map as a set of soft labels over a set of classes of the multi-class classification task. These set of soft labels may include floating point numbers representing probability values between 0 and 1, in contrast to hard-assigned labels that includes binary numbers (0 and 1) as class labels.

Typically, it may be required to up-sample the extracted first featured map to the original stride of the input first color image and use an auxiliary cross-entropy (CE) loss in order to preserve all the semantic context information stored in the original stride. However, if the extracted first feature map is scaled up, it may be required to store gradients in high resolution space, which may not be memory efficient for the training and may limit the number of strides for the use of auxiliary CE loss. On the other hand, if the final score map is down-sampled to the auxiliary stride, a portion of the semantic context information may be lost. In order to solve above issues, the system 102 may compute an auxiliary CE loss (also be referred to as soft CE loss) between the computed probability map and a ground truth probability map at the auxiliary stride. The auxiliary CE loss may be computed as part of the process to train the semantic segmentation network 110 and may help to preserve all the semantic context information stored in the input first color image at the original stride. The system 102 may then train the semantic segmentation network 110 for the multi-class classification task based on the computed auxiliary cross-entropy loss.

Additionally, or alternatively, the system 102 may extract the final score map from the output layer 114n of the semantic segmentation network 110 and compute a final cross-entropy loss based on the extracted final score map. The final score map may correspond to an output of the semantic segmentation network 110 for the input color image. The computed final cross-entropy loss may be, for example, a histogram weighted soft-max cross-entropy loss. The system 102 may estimate a global loss-measure for the semantic segmentation network 110 based on the computed auxiliary cross-entropy loss and the computed final cross-entropy loss. The semantic segmentation network 110 may be trained based on the estimated global loss-measure. More specifically, the training of the semantic segmentation network 110 may correspond to update of weights for different layers of the semantic segmentation network 110 till the estimated global loss-measure is a minimum.

Once trained, the semantic segmentation network 110 may be also referred to as the trained semantic segmentation network 110, ready to be deployed on suitable devices. After the training, operations related to the computation of the probability map and the computation of the auxiliary CE loss may not be needed to be performed and only the semantic segmentation network 110 may be used to generate classification results for color images as input to the semantic segmentation network 110. The system 102 may deploy the trained semantic segmentation network 110 on its own network and for its own applications. Additionally, or alternatively, the system 102 may deploy the trained semantic segmentation network on other external devices, such as the electronic device 106.

An exemplary scenario for use of the trained semantic segmentation network 110 for semantic image segmentation is described herein, for example. The system 102 may input a second color image to the trained semantic segmentation network 110 and then extract, from the output layer 114n of the trained semantic segmentation network 110, a classification result for each pixel of the input second color image. By way of example, and not limitation, the classification result may include a maximum score index of class. In other words, for every pixel of the second color image, the maximum scored index may represent a final class ID (among a set of class IDs/labels of the classification task) with a maximum score (probability) for the respective pixel. Since the trained semantic segmentation network 110 may itself output a probability map for the second color image, the classification result may be obtained based on computation of the maximum scored index of class. For example, the output of the trained semantic segmentation network 110 may be represented by a volume tensor (in [num_class×height×width]). To obtain a final class ID map or a final score map in 2D, the output may need to be reshaped to the size of the input color image (i.e. height×width (in pixels)), where each pixel is assigned to certain class ID and a color value. For that, the system 102 may apply an argmax operation on the volume tensor to extract maximum scored index of class channel.

Based on the classification result, the system 102 may generate a semantically segmented image which include a set of regions filled with a corresponding set of colors. Each region of the set of regions corresponds to a particular class of set of classes. For example, for an urban street image as input, the semantically segmented image may include different regions with respective pixels colored differently as per their assigned classes, like cars, buildings, roads, and the like.

Figure 2:
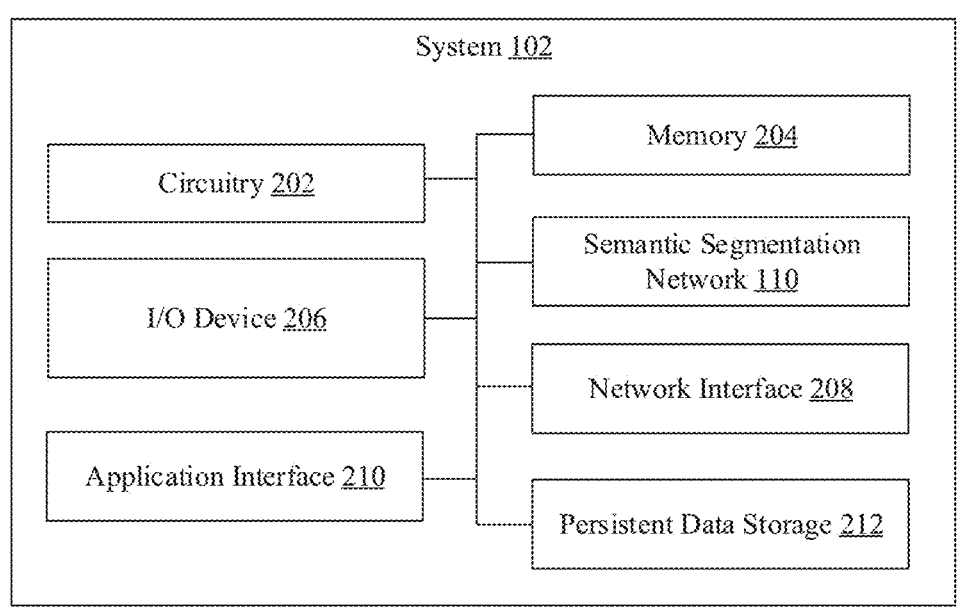
FIG. 2 is a block diagram of an exemplary system for semantic segmentation of input image frames, in accordance with an embodiment of the disclosure.

FIG. 2 is a block diagram of an exemplary system for semantic segmentation of input image frames, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, a network interface 208, an application interface 210, and a persistent data storage 212. The system 102 may also include the semantic segmentation network 110, as part of, for example, a software application for image-based decisioning in semi-autonomous or autonomous vehicles. The circuitry 202 may be communicatively coupled to the memory 204, the I/O device 206, the network interface 208, the application interface 210, and the persistent data storage 212. In one or more embodiments, the system 102 may also include a provision/functionality to capture images/videos via one or more image-capture devices, for example, the image-capture device 104.

The circuitry 202 may include suitable logic, circuitry, interfaces, and/or code that may be configured to train the semantic segmentation network 110 for the multi-class classification task on input color image frames. Once trained, the semantic segmentation network 110 may be either deployed on other electronic devices (e.g., the electronic device 106) or on the system 102 for real time semantic/panoptic image segmentation of image frames of a live/pre-captured video feed. The circuitry 202 may be implemented based on a number of processor technologies, which may be known to one ordinarily skilled in the art. Examples of implementations of the circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 204 may include suitable logic, circuitry, and/or interfaces that may be configured to store instructions executable by the circuitry 202. Additionally, the memory 204 may be configured to store program code of the semantic segmentation network 110 and/or the software application that may incorporate the program code of the semantic segmentation network 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user and the system 102. The I/O device 206 may include various input and output devices, which may be configured to communicate with different operational components of the system 102. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the system 102 to communicate with other devices, such as the electronic device 106, in the environment 100, via the communication network 108. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for a user to interact with the system 102. The application interface 210 may be configured to have a dynamic interface that may change in accordance with preferences set by the user and configuration of the system 102. In some embodiments, the application interface 210 may correspond to a user interface of one or more applications installed on the system 102.

The persistent data storage 212 may include suitable logic, circuitry, and/or interfaces that may be configured to store program instructions executable by the circuitry 202, operating systems, and/or application-specific information, such as logs and application-specific databases. The persistent data storage 212 may include a computer-readable storage media for carrying or having computer-executable instructions or data structures stored thereon. Such computer-readable storage media may include any available media that may be accessed by a general-purpose or special-purpose computer, such as the circuitry 202.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the circuitry 202 to perform a certain operation or a set of operations associated with the system 102. The functions or operations executed by the system 102, as described in FIG. 1, may be performed by the circuitry 202. The operations of the circuitry 202 are described in detail, for example, in FIGS. 4, 5A, 5B, 5C, and 5D.

Figure 3:
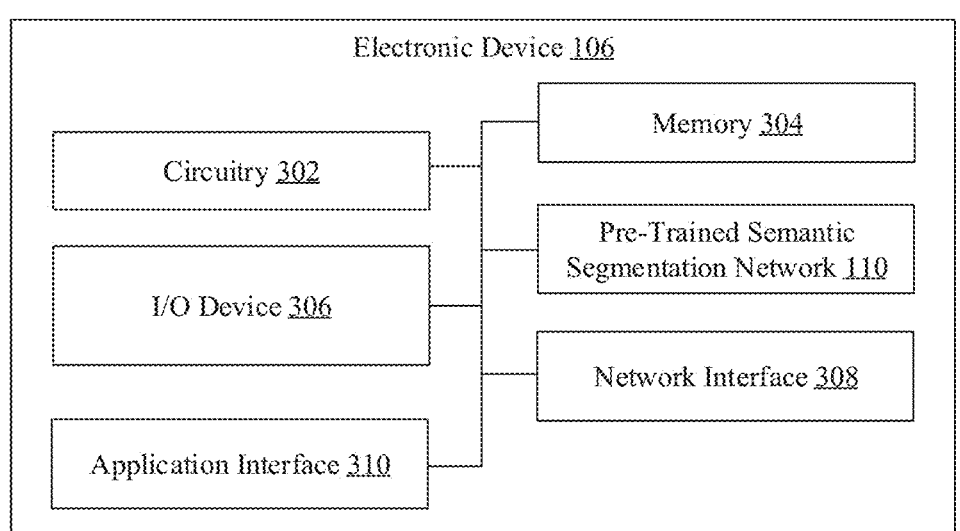
FIG. 3 is a block diagram of an exemplary electronic device for semantic segmentation of input image frames, in accordance with an embodiment of the disclosure.

FIG. 3 is a block diagram of an exemplary electronic device for semantic segmentation of input image frames, in accordance with an embodiment of the disclosure. With reference to FIG. 3, there is shown a block diagram 300 of the electronic device 106. The electronic device 106 may include circuitry 302, a memory 304, an I/O device 306, a network interface 308, and an application interface 310. The semantic segmentation network 110, once trained, may be deployed on the electronic device 106, as part of another software application for, for example, semi-autonomous or autonomous vehicles. The circuitry 302 may be communicatively coupled to the memory 304, the I/O device 306, the network interface 308, and the application interface 310. In at least one embodiment, the electronic device 106 may also include a provision/functionality to capture images/videos via one or more image-capture devices, for example, the image-capture device 104.

The circuitry 302 may include suitable logic, circuitry, interfaces, and/or code that may be configured to implement the semantic segmentation network 110 after the semantic segmentation network 110 is trained for the multi-class classification task on input color image frames (e.g., from a live video feed). The circuitry 302 may be implemented based on a number of processor technologies, which may be known to one ordinarily skilled in the art. An exemplary implementation of the circuitry 302 may be processor(s) of an in-vehicle ECU. Further example implementations of the circuitry 302 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chip(s), a co-processor, a central processing unit (CPU), and/or a combination thereof.

The memory 304 may include suitable logic, circuitry, and/or interfaces that may be configured to store instructions executable by the circuitry 302. Additionally, the memory 304 may be configured to store the semantic segmentation network 110 pre-trained based on the auxiliary Cross-Entropy (CE) loss for auxiliary layer(s) of the semantic segmentation network 110. The memory 304 may also store a program code of the semantic segmentation network 110 and/or the software application that may incorporate the program code of the semantic segmentation network 110. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 306 may include suitable logic, circuitry, and/or interfaces that may be configured to act as an I/O interface between a user and the electronic device 106. The I/O device 306 may include various input and output devices, which may be configured to communicate with different operational components of the electronic device 106. Examples of the I/O device 306 may include, but are not limited to, a touch screen, a keyboard, a mouse, a joystick, a microphone, and a display screen.

The network interface 308 may include suitable logic, circuitry, interfaces, and/or code that may be configured to facilitate different components of the electronic device 106 to communicate with other devices in the environment 100, via the communication network 108. The network interface 308 may be configured to implement known technologies to support wired or wireless communication. Components of the network interface 308 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 308 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 310 may be configured as a medium for a user to interact with the electronic device 106. The application interface 310 may be configured to have a dynamic interface that may change in accordance with preferences set by the user and configuration of the electronic device 106. In some embodiments, the application interface 310 may correspond to a user interface of one or more applications installed on the electronic device 106. For example, the application interface may be displayed on multi-information display (MID) of a self-driving vehicle and may allow a user to visualize information processed by the electronic device 106. The functions or operations executed by the electronic device 106, as described in FIG. 1, may be performed by the circuitry 302. The operations of the circuitry 302 are described in detail, for example, in FIG. 7.

Figure 4:
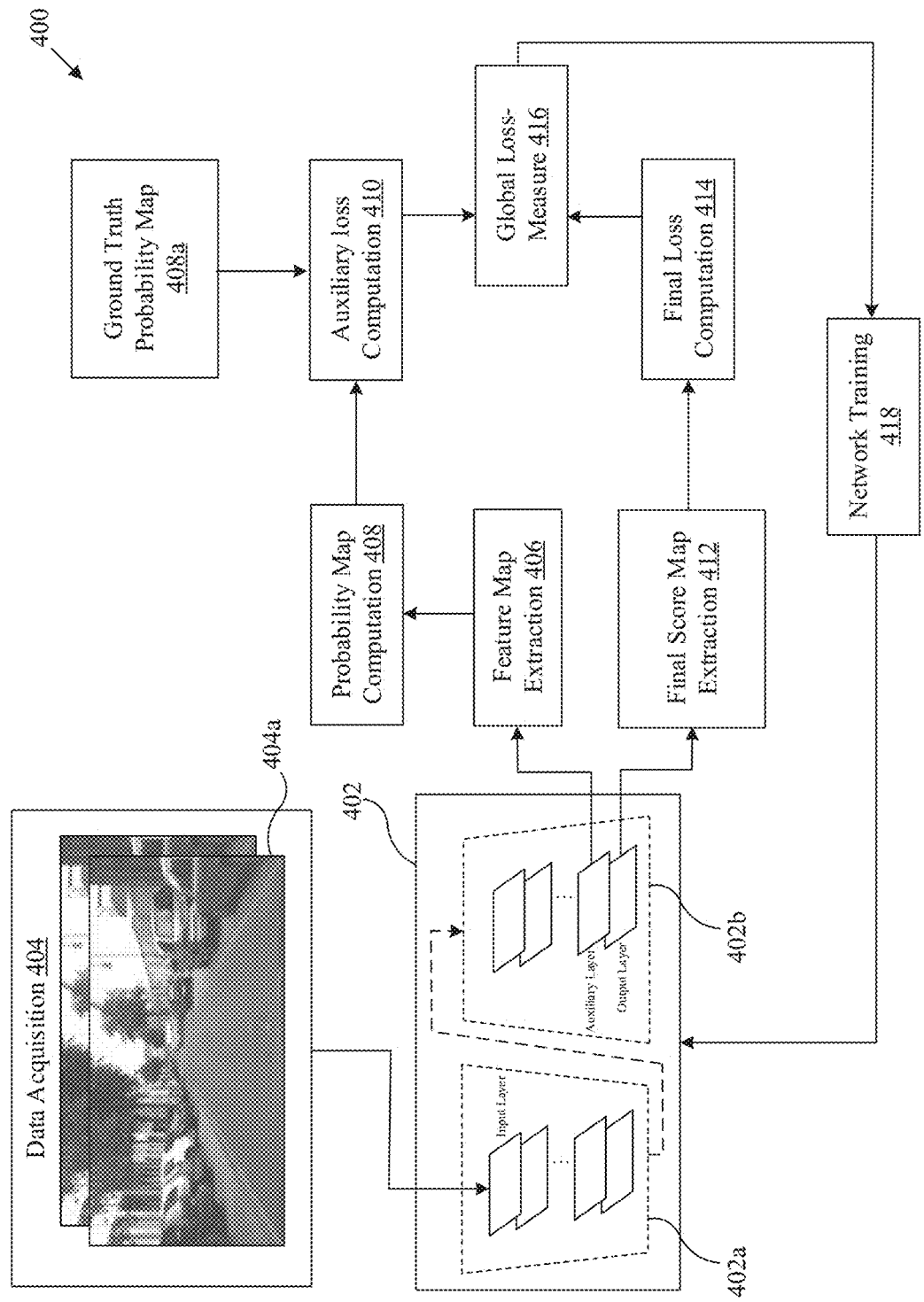
FIG. 4 is a diagram that illustrates exemplary operations for training of a semantic segmentation network for a multi-class classification task, in accordance with an embodiment of the disclosure.

FIG. 4 is a diagram that illustrates exemplary operations for training of a semantic segmentation network for a multi-class classification task, in accordance with an embodiment of the disclosure. FIG. 4 is explained in conjunction with elements from FIG. 1, FIG. 2, and FIG. 3. With reference to FIG. 4, there is shown a diagram 400 that illustrates a set of operations for training of a semantic segmentation network 402 for a multi-class classification task, as described herein. Herein, the multi-class classification task may be a dense classification task for the semantic segmentation of an input image frame and a task where class labels are assigned to individual pixels of the input image frame. The semantic segmentation network 402 may correspond to the semantic segmentation network 402 of FIG. 1 and may be, for example, modelled on a fully convolutional network (FCN) architecture with multiple stages. The following exemplary operations from 404 to 418 underline details of a training process of the semantic segmentation network 402. The following exemplary operations also exemplify application of auxiliary loss (e.g., auxiliary cross-entropy loss over soft-assigned labels for feature maps of auxiliary layers of the semantic segmentation network 402) at auxiliary strides in the training of the semantic segmentation network 402.

At 404, a data acquisition operation may be performed. In the data acquisition operation, the circuitry 202 may acquire a training dataset which may include a sequence of color images. An example of the training dataset may be a dataset of urban street images, which may be used to train deep neural networks for semantic image segmentation, for understanding urban street scenes, and to benchmark relative performance and accuracy of the trained deep neural networks. As shown, for example, the sequence of color images in the training dataset includes a first color image 404a of an urban street scene, which may include urban structures and objects, such as vehicles, roads, pedestrians, pavements, signages, and lighting fixtures.

As shown herein, the semantic segmentation network 402 may be based on an encoder-decoder architecture and may include an encoder network 402a and a decoder network 402b connected to an output of the encoder network 402a. An exemplary block-level architecture of the semantic segmentation network 402 is provided in FIG. 5, for example. Details of the aforementioned layers/blocks are also covered in detail, for example, in FIGS. 5A, 5B, 5C, and 5D.

The circuitry 202 may input the first color image 404a to an input layer of the semantic segmentation network 402 for the multi-class classification task, for example, a semantic image segmentation task. The encoder network 402a may receive the first color image 404a as the input at an initial stride and may output a feature map. The output feature map may be at a first stride that may be a multiple of the initial stride. Herein, a stride may refer to an output stride which represents a ratio of a size of the feature map with respect to a size of the first color image 404a. For example, if the initial stride is "1" for the first color image 404a of size 2048×1024 pixels, then a stride of 32 at the output of the encoder network 402a may denote that the size of the output feature map is 64×32 (i.e. 1/32 of the size of the first color image 404a).

The circuitry 202 may select an auxiliary layer from the semantic segmentation network 402. The selected auxiliary layer may correspond to an auxiliary stride (e.g., between 1 and 32) at which auxiliary loss (i.e. auxiliary Cross-Entropy (CE) loss) could be applied in the training the semantic segmentation network 402, so as to achieve optimal parameter size and reduced memory utilization. In at least one embodiment, the auxiliary layer may be selected from the decoder network 402b of the semantic segmentation network 402 based on a performance-measure for the semantic segmentation network 402. For example, as shown in Table 1, the performance-measure may be based on a memory usage by parameters computed at different strides in the training of the semantic segmentation network 402. Based on Table 1, auxiliary CE loss may be preferred to train the semantic segmentation network 402 at strides of [8, 16, 32], while Hard-CE loss on up-sampled score may hold only at stride of 32. This may indicate that auxiliary CE loss may support large input sizes for the semantic segmentation network 402.

In table 1, Soft-CE loss may refer to CE loss on soft-assigned labels (i.e. a probability distribution between 0 and 1) for feature/score maps of auxiliary layers of the semantic segmentation network 402. Hard-CE loss refer to CE loss on hard-assigned labels (i.e. binary labels 0 and 1) for feature/score maps of auxiliary layers of the semantic segmentation network 402.

TABLE 1

Ablation study of auxiliary loss memory usage while training the semantic segmentation network 402

| | Method | Memory usage | |
|---|---|---|---|
| Input Size | Aux Loss Strides | Hard-CE loss (Up-sampled) | Soft-CE loss |
| 2048 × 1024 | 4, 8, 16, 32 | Out of Memory | 10.8 GB |
| | 8, 16, 32 | Out of Memory | 10.2 GB |
| | 16, 32 | Out of Memory | 10.2 GB |
| | 32 | 11.6 GB | 10.2 GB |
| 1024 × 1024 | 4, 8, 16, 32 | 8.5 GB | 5.8 GB |
| | 8, 16, 32 | 7.8 GB | 5.4 GB |
| | 16, 32 | 6.9 GB | 5.4 GB |
| | 32 | 6.1 GB | 5.4 GB |

TABLE 2

Ablation study of having different auxiliary loss strategies affecting validation set performance

| Method | mIoU(%) |
|---|---|
| No Auxiliary Loss | 70.70 |
| Hard-CE Down sampled at stride 32 | 71.10 |
| Soft-CE at stride 32 | 71.40 |
| Soft-CE at stride 4, 8, 16, 32 | 72.60 |

It should be noted here that data provided in Table 1 and Table 2 should be merely be taken as experimental data and should not be construed as limiting for the present disclosure. For example, as shown in Table 2, the performance-measure may be based on % million Intersection-over-Union (IoU) on a validation data set. Table 2 shows how auxiliary loss type may affect the performance of the semantic segmentation network 402 on the validation data set. As further shown in Table 2, Soft-CE auxiliary loss applied to multiple auxiliary strides may perform the best. The semantic segmentation network 402 may generate, at an auxiliary stride, a first feature map as an output of the auxiliary layer (or the selected auxiliary layer(s)) of the semantic segmentation network 402 based on the input first color image 404a.

At 406, a feature map extraction operation may be performed. In the feature map extraction operation, the circuitry 202 may extract the generated first feature map from the auxiliary layer of the semantic segmentation network 402. For example, based on Table 1 and Table 2, auxiliary layers at strides of [4, 8, 16, 32] may be selected and respective feature maps from the auxiliary layers may be extracted so that auxiliary loss can be applied at such auxiliary layers, as part of the training of the semantic segmentation network 402.

Typically, in the training process, auxiliary loss is often used to regularize the network to learn better semantic context encoded on large stride features. However, having many auxiliary losses may consume memory (e.g., GPU memory) for the training and may limit a batch size and input resolution in a limited range (i.e. inputs need to be cropped). This is also exemplified from data shown in Table 1. Typically, on a large stride (e.g., 16/32), a ground truth probability map is used to compute the auxiliary loss. In case the ground truth probability map is down-sampled (e.g., 1/32 of input resolution), spatial information of the ground truth probability map may be truncated, and rich spatial context information may be lost. A typical solution may be to up-sample the feature map of the auxiliary stride to the initial stride (i.e. to the input resolution/size of the first color image 404a) and compute auxiliary loss, but it may sacrifice the memory. Therefore, instead of hard assignment where feature maps are assigned binary values (0 or 1), soft-assignment where feature maps are assigned soft labels (i.e. a probability distribution with floating point values between 0 and 1) may be preferred.

At 408, a probability map computation operation may be performed. In the probability map computation operation, the circuitry 202 may compute a probability map as a set of soft labels over a set of classes of the multi-class classification task, based on the extracted first feature map. The set of soft labels may include floating point values between 0 and 1 and may represent a probability distribution over the set of classes of the multi-class classification task. For example, for each value in the first feature map extracted from the auxiliary layer of the semantic segmentation network 402, a respective soft label may be computed and assigned. The respective soft label may be a floating point value with 0 and 1 and may represent a particular class (e.g., a class ID) of the set of classes (e.g., Class 0, 1 . . . 24). Table 3 provides a list of 8 classes and 8 class IDs for an urban street scene are provided in Table 3, for example.

TABLE 3

Classes and Class IDs for Urban Street Scene

| Class | Class ID |
|---|---|
| Tree | 0 |
| Car | 1 |
| Pedestrian | 2 |
| Pavement | 3 |
| Road | 4 |
| Signage | 5 |
| Street Light | 6 |
| Traffic Sign | 7 |
| Animal | 8 |

The soft assignment may be different from typical hard assignment, where one of the binary values are assigned to each value of the feature map. The resulting matrix with all the soft labels for the auxiliary stride may be referred to as the probability map or a probability distribution over the set of classes of the multi-class classification task.

Before the auxiliary loss can be computed, the circuitry 202 may also compute, at the auxiliary stride, a ground truth probability map 408a as a multi-label probability distribution over the set of classes. A conventional approach to obtain a ground truth probability map 408a at the auxiliary stride may be to down-sample the ground truth map of the initial stride (e.g., 1) to the auxiliary stride (e.g., 32). However, it may truncate spatial information originally present in the first color image 404a and such rich spatial context information may be lost. Therefore, the ground truth probability map 408a may be computed based on probability maps of one or more layers of the semantic segmentation network 402 before the auxiliary layer. For example, probability maps of the one or more layers before the auxiliary layer may be average pooled to generate the ground truth probability map 408a. Similar to the probability map for the auxiliary layer, the ground truth probability map 408a may also include soft labels and the size of the ground truth probability may be same as that of the probability map for the auxiliary stride.

At 410, an auxiliary loss computation operation may be performed. In the auxiliary loss computation operation, the circuitry 202 may compute an auxiliary CE loss between the computed probability map at the auxiliary stride and the computed ground truth probability map 408a at the auxiliary stride. Herein, the auxiliary CE loss may also be referred to as soft-CE loss in order to differentiate the term with CE loss with hard label assignment (Hard-CE), which is usually the case for classification tasks. By way of example, the soft-CE loss may be given by equation (1), as follows:

$$L_{SoftCE_j}(P_j, Q_j) = \frac{-1}{NK} \sum_{i=1}^{N} \sum_{c}^{k} p_{i,c} \log q_{i,c} \quad (1)$$

where $q_{i,c} \in Q_j$ is the probability map generated by the auxiliary layer, $p_{i,c} \in P_j$ is average pooled ground truth probability map at stride j, $c \in K$ is classes, and $i \in N$ is pixels at stride.

The computation using equation (1) may be equivalent to having Kullback-Leibler (KL) Divergence on cost volume p, q, where q encodes between-class probability that resides within stride. It should be noted here that each $p_{i,c}$ may not be one-hot binary map. Even with large stride, soft-CE loss may learn the semantic context information which lies in between each stride. Probability map at stride 1 may be made by one-hot encoding of the label and then average pooled to each of the auxiliary stride. After the pooling, probability map may contain a multi-label distribution which can be used to compute the soft-CE loss. With this, the spatial and the semantic context information can be preserved in a memory efficient way while the semantic segmentation network 402 is trained. With the application of soft-CE loss, gradient computation may utilize drastically less memory during training time. As the soft-CE loss may be memory efficient; therefore, it may be possible to provide images with a large size (e.g., 2048 pixels×1024 pixels) as inputs for the training of the semantic segmentation network 402. In contrast, many conventional training methods try to crop input images to keep a balance between batch size and memory space. Also, with reference to Table 1 and Table 2, use of the soft-CE loss may help to suppress memory usage, especially for backpropagation methods (e.g., with reduced size of gradient parameters) in the training of the semantic segmentation network 402. Also, the soft-CE loss may allow for inputs with larger input resolution (e.g., High-Definition (HD) Full-HD, or 4K resolutions) in the training of the semantic segmentation network 402 and for larger minibatch sizes which result in better IoU performance.

At 412, a final score map extraction may be performed. In the final score map extraction, the circuitry 202 may extract a final score map from the output layer of the semantic segmentation network 402. The final score map may correspond to an output of the semantic segmentation network 402 for the input first color image 404a and may be generated by the decoder network 402b at the initial stride of the encoder network 402a.

In at least one embodiment, an initial score map at an auxiliary stride (e.g., "4") may be computed by a scoring layer (for example, scoring layer 526 of FIG. 5A or scoring layer 622 of FIG. 6) of the decoder network 402b. In this case, the scoring layer may precede the output layer of the semantic segmentation network 402. As the size of the initial score map is less than that of the input color image (i.e. the first color image 404a); therefore, for a pixel-wise classification, the initial score map needs to be up-sampled to the initial stride (e.g., 1). Therefore, at the output layer, the decoder network 402b may up-sample the initial score map to the final score map at the initial stride of, say "1".

By way of example, and not limitation, the decoder network 402b may receive, at the first stride (e.g., 32), the feature map from the encoder network 402a and may output the final score map back at the initial stride (e.g., 1). Herein, the resolution of the final score map may be same as the resolution of the first color image 404a provided as input to the semantic segmentation network 402. In other words, for each pixel in the first color image 404a, a corresponding score value may exist in the final score map.

At 414, a final loss computation may be performed. In the final loss computation, the circuitry 202 may compute a final CE loss based on the extracted final score map. The final CE loss may be, for example, a histogram weighted soft-max cross-entropy loss computed between the extracted final score map and a ground truth probability map at the initial stride (i.e. 1).

At 416, a global loss-measure estimation may be performed. In the global loss-measure estimation, the circuitry 202 may estimate a global loss-measure for the semantic segmentation network 402 based on the computed auxiliary cross-entropy loss and the computed final cross-entropy loss. For example, in order to train the semantic segmentation network 402, a global loss-measure as a value of a hybrid loss function may be estimated using equation (2), as follows:

$$L = L_{hard-CE} + \alpha \sum_j L_{soft-CE} \quad (2)$$

where, L may be the hybrid loss function,
$L_{Hard-CE}$ may be a histogram weighted Soft-max CE-loss computed on the final score map at 412,
$L_{Soft-CEj}$ may auxiliary loss (at 410) on each auxiliary strides, and
α may be a coefficient parameter for linear combination.

At 418, a network training operation may be performed. In the network training operation, the circuitry 202 may train the semantic segmentation network 402 for the multi-class classification task based on the auxiliary CE loss (estimated at 410). Additionally, in certain embodiments, the semantic segmentation network 402 may be further trained based on the estimated global loss-measure. For example, in the training of the semantic segmentation network 402, weights for nodes/neurons in different layers of the semantic segmentation network 402 may be updated iteratively till the estimated global loss-measure is a minimum. This may mean that both the auxiliary CE loss and the final CE loss may be computed iteratively, and the weights may be updated based on suitable optimization methods. For example, Adam optimization method with betas=[0.9, 0.999] and initial learning rate of 1e^3, a minibatch size of 18 may be used. Additionally, a step learning rate decay factor of 0.5 per 50 epochs may be used.

In contrast to conventional FCN-based networks, the semantic segmentation network 402, once trained, may offer a reduced computational complexity, a reduced parameter size, and a balance between semantic context and spatial context of the input image frames in outputs of semantic segmentation network 402. In contrast, conventional FCN-based networks have a higher computation complexity (e.g., in terms of Giga Floating Point Operations (GFLOPS) or million IOUs, larger parameter size due to larger number of gradient computations in the training, and a greater loss of the semantic context and the spatial context in deeper layers of conventional semantic segmentation network. Once trained, the semantic segmentation network 402 may be suitable for understanding of complex semantic structure of scenes captured in color images and especially for applications which use outputs of the semantic segmentation network 402 to produce real time inferences and make suitable decisions in complex situations. For example, one of the real-time application may be related to a self-driving vehicle (SDV). The SDV may deploy the trained semantic segmentation network 402 and provide real-time video feed of surrounding environment to the deployed semantic segmentation network 402 to understand scene for autonomous control in situations. The output of the deployed semantic segmentation network 402 may be used to identify drivable area (occupancy map) or to differentiate between sidewalks, terrain, obstacles, pedestrians, other vehicles, walls, poles, and the like. Although, in FIG. 4, discrete operations from 404 to 418 are described, the disclosure may not be so limited. Accordingly, in certain embodiments, such discrete operations may be further divided into additional operations, combined into fewer operations, or eliminated, depending on the particular implementation without detracting from the essence of the disclosed embodiments.

After the training, operations related to the computation of the probability map (at 408) and the computation of the auxiliary CE loss (at 410) may not be needed to be performed and therefore, may be pruned out of the set of operations at the time of deployment of the trained semantic segmentation network 402. In such cases, only the trained semantic segmentation network 402 may be used to generate classification results for color images as input to the trained semantic segmentation network 402.

Figure 5A:
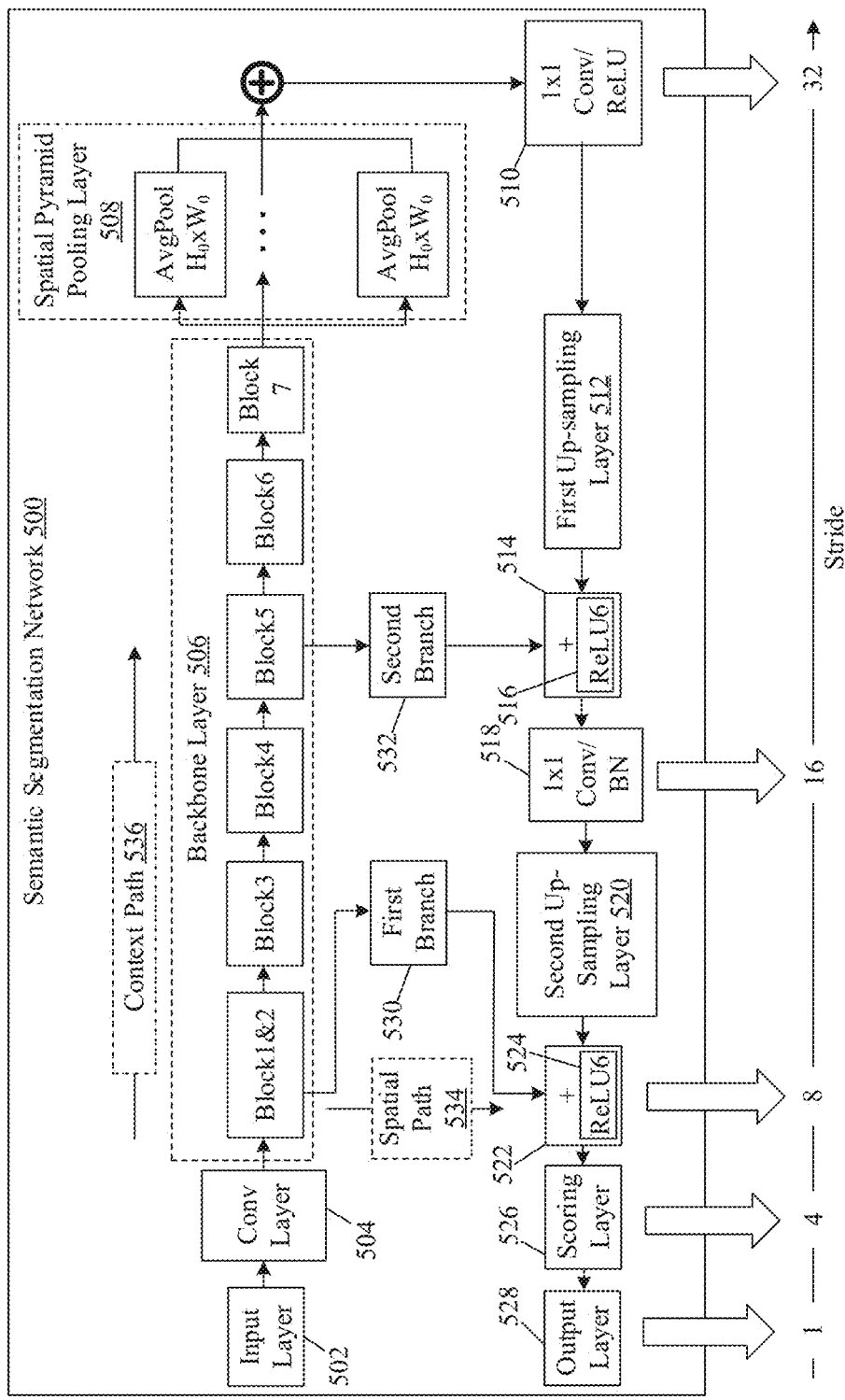
FIG. 5A is a diagram that illustrates an exemplary architecture of a semantic segmentation network, in accordance with an embodiment of the disclosure.

FIG. 5A is a diagram that illustrates an exemplary architecture of a semantic segmentation network, in accordance with an embodiment of the disclosure. With reference to FIG. 5, there is shown an exemplary architecture of a semantic segmentation network 500. The semantic segmentation network 500 may be an example of the semantic segmentation network 500 of FIG. 1 and the semantic segmentation network 402 of FIG. 4.

In the exemplary architecture, there is shown an input layer 502, a convolution layer 504, a backbone layer 506 including a plurality of backbone blocks. The backbone layer 506 may be followed by a spatial pyramid pooling layer 508 and 1×1 convolution/ReLU layer 510, a first up-sampling layer 512, and a first pooling layer 514. The first pooling layer 514 may be followed by ReLU6 516, a 1×1 convolution/batch normalization layer 518, a second up-sampling layer 520, and a second pooling layer 522. The second pooling layer 522 may be also followed by a ReLU6 524, a scoring layer 526, and an output layer 528. Additionally, the exemplary architecture may include a first branch 530 and a second branch 532. Both the first branch 530 and the second branch 532 may split from a different block of the backbone layer 506 and merge at the second pooling layer 522 and the first pooling layer 514, respectively.

The input layer 502 may receive a color image as input and may pass on the input to the convolution layer 504. The convolution layer 504 may include a convolution function, a ReLU, and a batch normalization function. The output of the convolution layer 504 may be a feature map which may be passed on to the backbone layer 506.

The plurality of backbone blocks of the backbone layer 506 may include Blocks1&2, Block3, Block4, Block5, Block6, and Block7. The plurality of backbone blocks be based on a densely-connected convolutional neural network (hereinafter, referred to as dense-net). Each backbone block may include at least one Dense-Block including a group of convolution layers, where each convolution layer of the group of convolution layers may be connected to all previous convolution layers. Also, at each convolution layer, feature maps from previous layers may be concatenated. The Dense-Block may also include one or more transition layers in between the one or more convolution layers. Each transition layer may down-sample activation/feature maps from previous layer(s) in their respective Dense-Block of the backbone layer 506 and may include suitable activation functions (e.g., ReLU) and batch normalization functions.

Herein, the semantic segmentation network 500 may branch out into a spatial path 534 and a context path 536. The spatial path and the context path may be pooled back. The spatial path 534 may preserve spatial information of the input color image at each stride of the semantic segmentation network 500, while the semantic segmentation network 500 is trained. Similarly, the context path 536 may preserve semantic context information of the input color image at each stride, while the semantic segmentation network 500 is trained.

Spatial Feature Branching: Output of a first convolution block of the Block1&2 may split along the first branch 530 to extract spatial features. Here, the first branch 530 may form the spatial path 534 of the semantic segmentation network 500. Since the first convolution block may tend to learn to capture primitive shape information from the input color image, the first branch 530 may extract spatial features, for example, with a stride of 8, to be later fused together the second pooling layer 522.

Context Extraction: In order to reduce the computational complexity where most of it comes from spatial resolution of the input color image, the transition layer(s) in the Dense-Block may down-sample feature map(s) to higher stride level, e.g., 8, before the feature map(s) are provided to the first Dense-Block of the backbone layer 506. Here, the plurality of backbone blocks may form the context path 536 of the semantic segmentation network 500. Within each Dense-Block, a number of down-sampling stages (i.e. transition layers) may be reduced to twice instead of three times and dilated convolution may be applied on feature maps within Dense-Layers of the Dense-Block to increase a receptive field size, without a sacrifice in parameter size and computational complexity.

Spatial Pyramid Pooling: The spatial pyramid pooling layer 508 may employ a dynamic spatial pooling method which may perform average pooling of output feature map(s) from the backbone layer 506, over multiple scales automatically given a size of input feature space. For example, at first, global average pooling may be performed, where feature height and width [h0, w0] may be equal to a size [$kh_o$, $kw_o$] of a filter kernel used in the spatial pyramid pooling layer 508. The global average pooling may be followed by a downsizing operation, where the filter kernel may be downsized by factor of, say 0.5, while either sides [khj, kwj] of the filter kernel may be equal to or greater than 4, i.e. khj=4 or kwj=4. This may be referred to as Dynamic Pyramid Spatial Pooling (DPSP). After DPSP, output feature maps from the DPSP may be provided to the 1×1 convolution/ReLU layer 510 for application of 1×1 convolution, followed by a batch normalization and a ReLU function. The output of the spatial pyramid pooling layer 508 may include the sematic context information of the input color image.

Fusion and Up-sample: At the second pooling layer 522, the semantic context information (from the second branch 532 and spatial pyramid pooling layer 508) may be fused together. Similarly, at the first pooling layer 514, the semantic context information from the second pooling layer 522 may be fused together with the spatial information (or spatial features from first branch 530). Fusion for first branch 530 and the second branch 532 may be performed with element-wise sum followed by a ReLU function. Before the first pooling layer 514, the first up-sampling layer 512 may be used to up-sample output of the spatial pyramid pooling layer 508. Similarly, before the second pooling layer 522, the second up-sampling layer 520 may be used to further up-sample output of the first pooling layer 514. Only after the first branch 530, additional 1×1 convolution with Batch Norm may be applied on the output of the first pooling layer 514 to align the feature size to the next stride level. The output feature map size of the first up-sampling layer 512 may be, for example, 168, while and the output feature map size for the second up-sampling layer 520 is 128. After the second pooling layer 522, at which the spatial information is fused with the semantic context information, output feature map of the second pooling layer 522, upscaled to a stride of 8, may be passed to the scoring layer 526, which may output the final score map for the input color image.

It should be note here that the exemplary architecture provided in FIG. 5 is merely provided as an example for training on the soft-CE loss and should not be construed as limiting for the scope of the disclosure. The disclosed operations (in FIGS. 1 and 4) for the training of the semantic segmentation network 500 are also applicable for any arbitrary semantic segmentation network with an encoder-decoder type architecture.

Figure 5B:
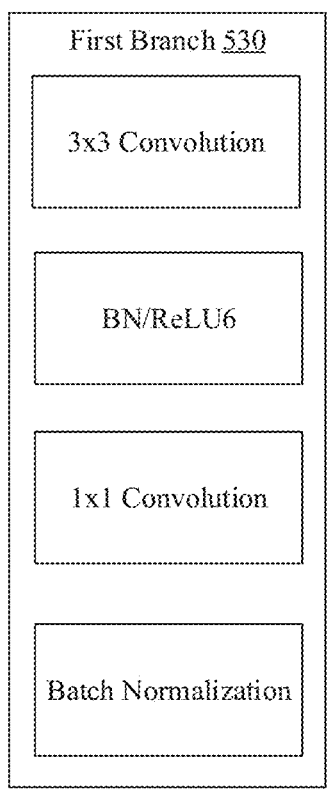
FIGS. 5B, 5C, and 5D are diagrams that illustrate branch blocks and up-sampling layers in the exemplary architecture of FIG. 5A, in accordance with an embodiment of the disclosure.
Figure 5C:
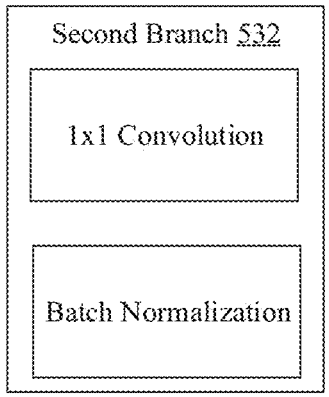
Figure 5D:
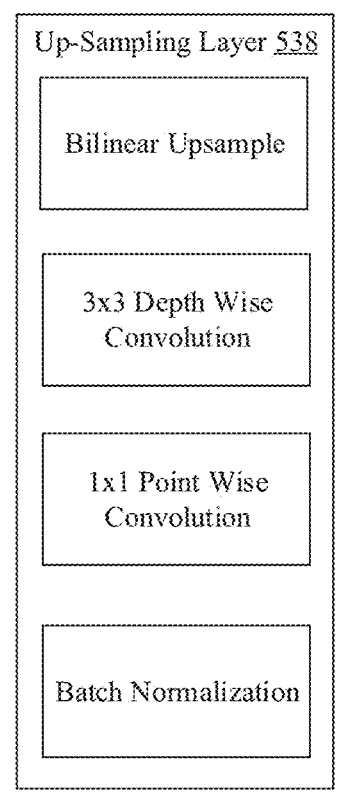

FIGS. 5B, 5C, and 5D are diagrams that illustrate branch blocks and up-sampling layers in the exemplary architecture of FIG. 5A, in accordance with an embodiment of the disclosure. FIGS. 5B, 5C, and 5D are explained in conjunction with elements from FIGS. 1, 2, 3, 4, and 5A. With reference to FIGS. 5B, 5C, and 5D, there is shown the first branch 530, the second branch 532, and an up-sampling layer 538 of the semantic segmentation network of FIG. 5A.

The first branch 530 may include a 3×3 convolution, followed by a batch normalization/ReLU activation with an upper bound of 6, a 1×1 convolution, and batch normalization. Here, ReLU refers to a rectified linear function. The first branch 530 may extract the spatial feature of the input color image as the spatial information along the spatial path 534 of the semantic segmentation network 500. The spatial path 534 may help to preserve the spatial information in the input color image throughout a training duration of the semantic segmentation network 500.

The second branch 532 may include a 1×1 convolution and a batch normalization. The up-sampling layer 538 may include a bilinear up-sampling function, a 3×3 Depth-Wise convolution, a 1×1 Point-Wise convolution, and batch normalization. The up-sampling layer 538 may be applicable to both the first up-sampling layer 512 and the second up-sampling layer 520, both of which are used to upscale feature maps at suitable strides.

Figure 6:
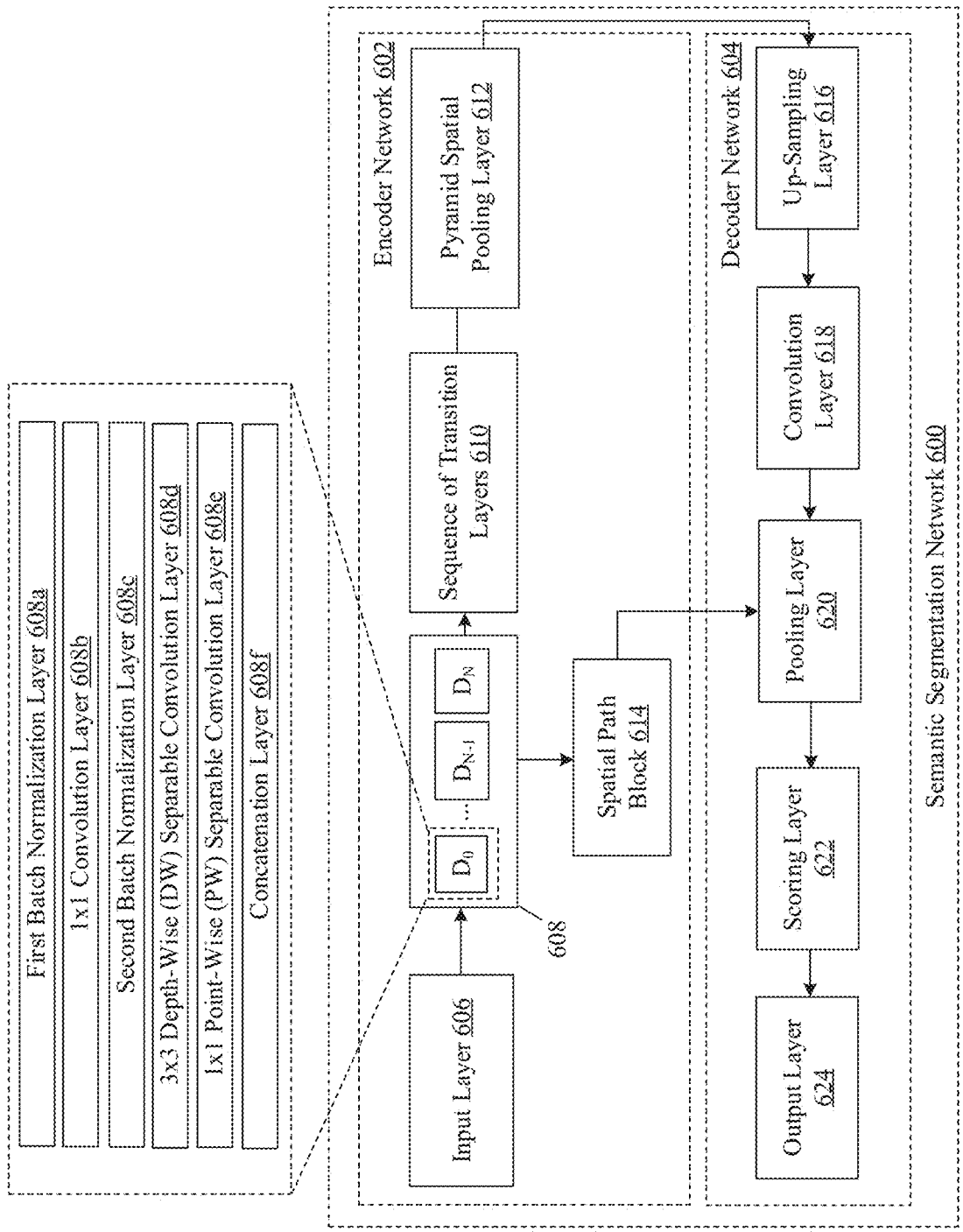
FIG. 6 is a diagram that illustrates another exemplary architecture of a semantic segmentation network, in accordance with an embodiment of the disclosure.

FIG. 6 is a diagram that illustrates another exemplary architecture of a semantic segmentation network, in accordance with an embodiment of the disclosure. FIG. 6 is explained in conjunction with elements from FIG. 1, FIG. 2, FIG. 3, FIG. 4, FIG. 5A, and FIGS. 5B, 5C, and 5D. With reference to FIG. 6, there is shown an exemplary architecture of a semantic segmentation network 600. The semantic segmentation network 600 may be an example of the semantic segmentation network 110 of FIG. 1 and the semantic segmentation network 402 of FIG. 4.

In the exemplary architecture, the semantic segmentation network 600 may include an encoder network 602 and a decoder network 604 connected to an output of the encoder network 602. The encoder network 602 may include an input layer 606, a sequence of Dense-Blocks 608 and a sequence of transition layers 610. The encoder network 602 may also include a pyramid spatial pooling layer 612, and a spatial path block 614.

The decoder network 604 may include an up-sampling layer 616, a convolution layer 618, a pooling layer 620, a scoring layer 622, and an output layer 624. The spatial path block 614 (same as the first branch 530) may branch out from one of the sequence of Dense-Blocks 608 and may merge back with the pooling layer 620 of the decoder network 604. Each Dense-Block of the sequence of Dense-Blocks 608 may include a first batch normalization layer 608a, a 1×1 convolution layer 608b, a second batch normalization layer 608c, a 3×3 Depth-Wise (DW) separable convolution layer 608d, a 1×1 Point-Wise (PW) separable convolution layer 608e, and a concatenation layer 608f. Details of the blocks/layers of the semantic segmentation network have been already provided in FIG. 1 and FIGS. 5A, 5B, 5C, and 5D and therefore, are omitted from the disclosure for the sake of brevity.

Figure 7:
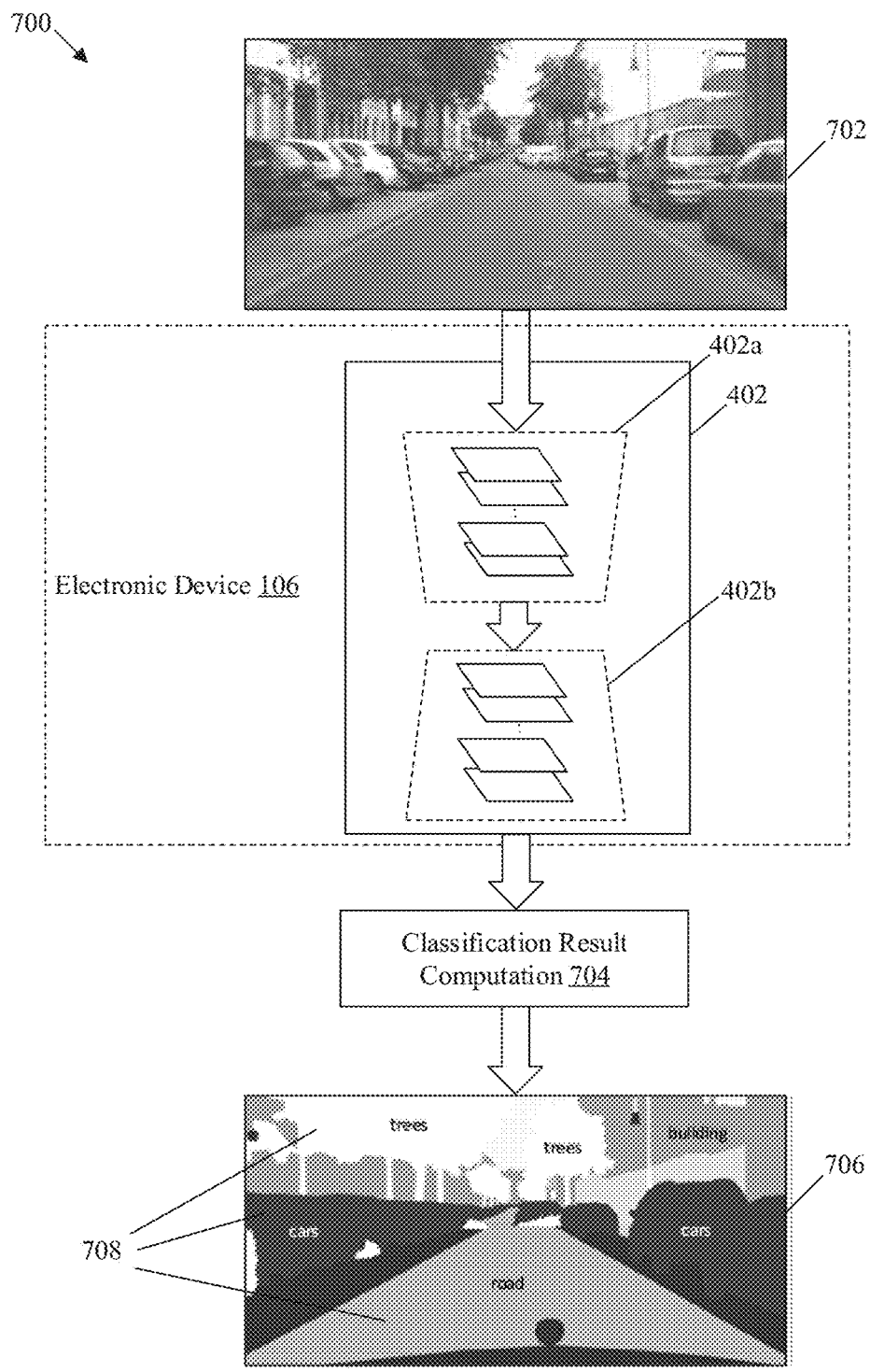
FIG. 7 is a diagram that illustrates an exemplary implementation of the semantic segmentation network of FIG. 4 on the electronic device of FIG. 3, in accordance with an embodiment of the disclosure.

FIG. 7 is a diagram that illustrates an exemplary implementation of the semantic segmentation network of FIG. 4 on the electronic device of FIG. 3, in accordance with an embodiment of the disclosure. FIG. 7 is explained in conjunction with elements from FIGS. 1, 3, 4, 5A, 5B, 5C, 5D, and 6. With reference to FIG. 7, there is shown a diagram 700 that illustrates the implementation of the semantic segmentation network 402 on the electronic device 106. Once the semantic segmentation network 402 is trained on the system 102 based on operations from 404 to 418 of FIG. 4, the semantic segmentation network 402 may be ready to be deployed on different devices, such as the electronic device 106.

Once deployed on the electronic device 106, the memory 304 may store the semantic segmentation network 402 and integrate the functionality of the semantic segmentation network 402 with program code of applications that may need output of the semantic segmentation network 402. An example application may be an autonomous control application in a self-driving vehicle. The autonomous control application may rely on the output of the semantic segmentation network 402 to differentiate between various object types in FOV of its camera-sensor, and to take suitable driving decisions or inferences in real/near-real time.

On the electronic device 106, the circuitry 302 may input a color image 702 to the input layer of the semantic segmentation network 402. For example, the input color image 702 may be associated with an urban street scene which includes cars, buildings, lighting fixtures, signages, roads, pedestrians, and the like. Once the input color image 702 is received, the semantic segmentation network 402 may perform a classification result computation 704, which may include a score map at the initial stride (i.e. 1). As the size of the score map may be same as that of the input color image 702, each point in the score map may represent a class label of a corresponding pixel of the input color image 702.

The computation of the classification result may include a maximum score index of class. Since the trained semantic segmentation network 402 may itself output a probability map for the input color image 702, the classification result may be obtained based on computation of the maximum scored index of class. For example, the output of the trained semantic segmentation network 402 may be represented by a volume tensor (in [num_class×height×width]). To obtain a final class ID map or a final score map in 2D, the output may need to be reshaped to the size of the input color image 702 (i.e. height×width (in pixels)), where each pixel is assigned to certain class ID and a color value. For that, the electronic device 106 may apply an argmax operation on the volume tensor to extract maximum scored index of class channel. Thereafter, the circuitry 302 may extract, from the output layer of the semantic segmentation network 402, the classification result for each pixel of the input color image 702. The classification result may include, for example, the score map with a resolution equal to that of the input color image 702. Each value of the score map may predict a class label, among a set of class labels, for each pixel of the input color image 702.

The circuitry 302 may then generate a semantically segmented image 706 based on the classification result. The semantically segmented image 706 may include a set of regions 708 filled with a corresponding set of colors and each region of the set of regions 708 may correspond to a particular class of the multi-class classification task. For example, the semantically segmented image 706 indicates pixels that belong to a trees label by one color, pixels that belong to a cars label by another color, and pixels that belong to the buildings label by another color.

Figure 8:
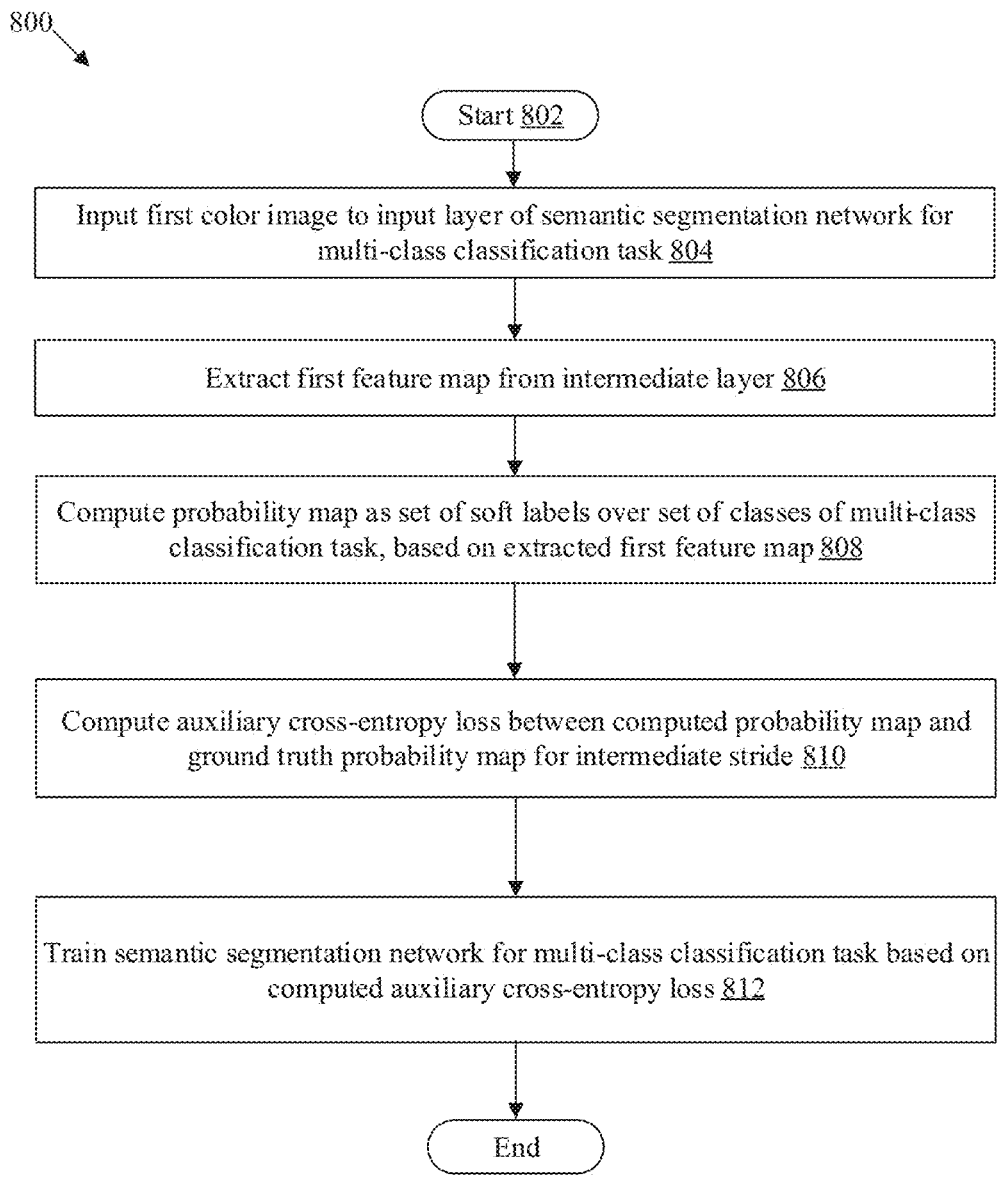
FIG. 8 is a flowchart that illustrates an exemplary method for semantic segmentation with a soft cross-entropy loss, in accordance with an embodiment of the disclosure.

FIG. 8 is a flowchart that illustrates an exemplary method for semantic segmentation with a soft cross-entropy loss, in accordance with an embodiment of the disclosure. With reference to FIG. 8, there is shown a flowchart 800. The operations of the exemplary method may be executed by any computing system, for example, by the system 102 of FIG. 2. The operations of the flowchart 800 may start at 802 and proceed to 804.

At 804, the first color image may be input to the input layer of the semantic segmentation network 110. In at least one embodiment, the circuitry 202 may input the first color image to the input layer of the semantic segmentation network 110. The semantic segmentation network 110 may generate, at the auxiliary stride, a first feature map as an output of an auxiliary layer of the semantic segmentation network 110 based on the input first color image.

At 806, the first feature map may be extracted from the auxiliary layer of the semantic segmentation network 110. In at least one embodiment, the circuitry 202 may extract the first feature map from the auxiliary layer of the semantic segmentation network 110.

At 808, a probability map as a set of soft labels may be computed over a set of classes of a multi-class classification task based on the extracted first feature map. In at least one embodiment, the circuitry 202 may compute the probability map as the set of soft labels over the set of classes of the multi-class classification task based on the extracted first feature map.

At 810, an auxiliary CE loss may be computed between the computed probability map and a ground truth probability map at the auxiliary stride. In at least one embodiment, the circuitry 202 may compute the auxiliary CE loss between the computed probability map and the ground truth probability map at the auxiliary stride.

At 812, the semantic segmentation network 110 may be trained for the multi-class classification task based on the computed auxiliary CE loss. In at least one embodiment, the circuitry 202 may train the semantic segmentation network 110 for the multi-class classification task based on the computed auxiliary CE loss. Control may pass to end.

Various embodiments of the disclosure may provide a non-transitory computer readable medium and/or storage medium having stored thereon, instructions executable by a machine and/or a computer to operate a system for semantic segmentation with a soft cross-entropy loss. The instructions may cause the machine and/or computer to perform operations that include inputting a first color image to an input layer of a semantic segmentation network for a multi-class classification task. The multi-class classification task may correspond to a classification of each pixel of the first color image into one of the set of classes. The operations may further include generating, by the semantic segmentation network at an auxiliary stride, a first feature map as an output of an auxiliary layer of the semantic segmentation network based on the input first color image. The operations may further include extracting the generated first feature map from the auxiliary layer and computing a probability map as a set of soft labels over a set of classes of the multi-class classification task, based on the extracted first feature map. The operation may further include computing an auxiliary cross-entropy loss between the computed probability map and a ground truth probability map at the auxiliary stride and training the semantic segmentation network for the multi-class classification task based on the computed auxiliary cross-entropy loss.

Various embodiments of the disclosure may provide a non-transitory computer readable medium and/or storage medium having stored thereon, instructions executable by a machine and/or a computer to operate an electronic device for semantic segmentation with a soft cross-entropy loss. The instructions may cause the machine and/or computer to perform operations that include storing a semantic segmentation network pre-trained based on an auxiliary cross-entropy loss for an auxiliary layer of the semantic segmentation network. The operations may further include inputting a color image to an input layer of the semantic segmentation network and extract, from an output layer of the semantic segmentation network, a classification result for each pixel of the input color image. The operations may further include generating a semantically segmented image based on the extracted final score map. The semantically segmented image may include a set of regions filled with a corresponding set of colors and each region of the set of regions may correspond to a class of a multi-class classification task.

Certain embodiments of the disclosure may be found in a system and method for semantic segmentation with a soft cross-entropy loss. Various embodiments of the disclosure may provide the system 102 (FIG. 1) that may include the circuitry 202 (FIG. 2). The circuitry 202 may be configured to input a first color image to an input layer 110a of the semantic segmentation network 110 for a multi-class classification task. The multi-class classification task may correspond to a classification of each pixel of the first color image into one of the set of classes. The semantic segmentation network 110 may generate, at an auxiliary stride, a first feature map as an output of the auxiliary layer 116 of the semantic segmentation network 110 based on the input first color image. The circuitry 202 may be further configured to extract the generated first feature map from the auxiliary layer 116 and compute a probability map as a set of soft labels over a set of classes of the multi-class classification task, based on the extracted first feature map. Thereafter, the circuitry 202 may be further configured to compute an auxiliary cross-entropy loss between the computed probability map and a ground truth probability map for the auxiliary stride and train the semantic segmentation network 110 for the multi-class classification task based on the computed auxiliary cross-entropy loss.

In accordance with an embodiment, the semantic segmentation network 110 may include an encoder network 112 and a decoder network 114 connected to the output 112n of the encoder network 112. The encoder network 112 may receive the first color image as the input at an initial stride and may output a second feature map at a first stride. The first stride may be a multiple of the initial stride. The decoder network 114 may receive the second feature map at the first stride and may output a final score map back at the initial stride.

In accordance with an embodiment, the circuitry 202 may be further configured to select the auxiliary layer 116 from the decoder network 114 of the semantic segmentation network 110 based on a performance-measure for the semantic segmentation network 110.

In accordance with an embodiment, the auxiliary stride may correspond to a ratio of a size of the first feature map to a size of the first color image. Similarly, the first stride may correspond to a ratio of a size of the second feature map as to a size of the first color image.

In accordance with an embodiment, the semantic segmentation network 110 may branch out into a spatial path 534 and a context path 536 which may be pooled back later before the output layer 528 of the semantic segmentation network 110. Herein, the spatial path 534 may preserve spatial information of the first color image at each stride of the semantic segmentation network 110, while the semantic segmentation network 110 is trained. Similarly, the context path 536 may preserve semantic context information of the first color image at each stride, while the semantic segmentation network 110 is trained.

In accordance with an embodiment, the encoder network 602 may include an input layer 606, a sequence of Dense-Blocks 608, a sequence of transition layers 610, a pyramid spatial pooling layer 612, and a spatial path block 614. Similarly, the decoder network 604 may include an up-sampling layer 616, a convolution layer 618, a pooling layer 620, and a scoring layer 622. The spatial path block 614 may branch out from one of the sequence of Dense-Blocks 608 and merge back with the pooling layer 620 of the decoder network 114. In accordance with an embodiment, each Dense-Block of the sequence of Dense-Blocks 608 may include a first batch normalization layer 608a, a 1×1 convolution layer 608b, a second batch normalization layer 608c, a 3×3 Depth-Wise (DW) separable convolution layer 608d, a 1×1 Point-Wise (PW) separable convolution layer 608e, and a concatenation layer 608f.

In accordance with an embodiment, the circuitry 202 may be further configured to compute, at the auxiliary stride, the ground truth probability map 408a as a multi-label probability distribution over the set of classes based on probability maps of one or more layers of the semantic segmentation network 110 before the auxiliary layer 116.

In accordance with an embodiment, the circuitry 202 may be further configured to extract a final score map from the output layer 114n of the semantic segmentation network 110. The final score map may correspond to an output of the semantic segmentation network 110 for the input color image. The circuitry 202 may be further configured to compute a final cross-entropy loss based on the extracted final score map. The computed final cross-entropy loss may be, for example, a histogram weighted soft-max cross-entropy loss. The circuitry 202 may be further configured to estimate a global loss-measure for the semantic segmentation network 110 based on the computed auxiliary cross-entropy loss and the computed final cross-entropy loss and train the semantic segmentation network 110 further based on the estimated global loss-measure. The training of the semantic segmentation network 110 may correspond to an update of weights for different layers of the semantic segmentation network 110 till the estimated global loss-measure is a minimum.

In accordance with an embodiment, the circuitry 202 may be further configured to input a second color image to the trained semantic segmentation network 110 and extract, from the output layer 114n of the trained semantic segmentation network 110, a classification result for each pixel of the input second color image. Thereafter, based on the classification result, the circuitry 202 may be further configured to generate a semantically segmented image, including a set of regions filled with a corresponding set of colors. Each region of the set of regions may correspond to a class of set of classes.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A system, comprising:
circuitry configured to:
input a first color image to an input layer of a semantic segmentation network for a multi-class classification task,
wherein the semantic segmentation network generates, at an auxiliary stride, a first feature map as an output of an auxiliary layer of the semantic segmentation network based on the input first color image, extract the generated first feature map from the auxiliary layer;
compute a probability map as a set of soft labels over a set of classes of the multi-class classification task, based on the extracted first feature map;
compute an auxiliary cross-entropy loss between the computed probability map and a ground truth probability map for the auxiliary stride;
extract a final score map from an output layer of the semantic segmentation network, wherein the final score map corresponds to an output of the semantic segmentation network for the first color image;
compute a final cross-entropy loss based on the extracted final score map; and
train the semantic segmentation network for the multi-class classification task based on the computed auxiliary cross-entropy loss and the computed final cross-entropy loss.

2. The system according to claim 1, wherein
the semantic segmentation network comprises an encoder network and a decoder network connected to an output of the encoder network,
the encoder network receives the first color image as the input at an initial stride and outputs a second feature map at a first stride,
the first stride being a multiple of the initial stride, and
the decoder network receives the second feature map at the first stride and outputs the final score map back at the initial stride.

3. The system according to claim 2, wherein the circuitry is further configured to select the auxiliary layer from the decoder network of the semantic segmentation network based on a performance-measure for the semantic segmentation network.

4. The system according to claim 2, wherein
the auxiliary stride corresponds to a ratio of a size of the first feature map to a size of the first color image, and
the first stride corresponds to a ratio of a size of the second feature map as to the size of the first color image.

5. The system according to claim 2, wherein
the encoder network comprises the input layer, a sequence of Dense-Blocks, a sequence of transition layers, a pyramid spatial pooling layer, and a spatial path block,
the decoder network comprises an up-sampling layer, a convolution layer, a pooling layer, a scoring layer, and the output layer, and the spatial path block branches out from one of the sequence of Dense-Blocks and merges back with the pooling layer of the decoder network.

6. The system according to claim 5, wherein each Dense-Block of the sequence of Dense-Blocks comprises a first batch normalization layer, a 1.times.1 convolution layer, a second batch normalization layer, a 3.times.3 Depth-Wise (DW) separable convolution layer, a 1.times.1 Point-Wise (PW) separable convolution layer, and a concatenation layer.

7. The system according to claim 1, wherein
the semantic segmentation network branches out into a spatial path and a context path,
the spatial path and the context path are pooled back before the output layer of the semantic segmentation network,
the spatial path preserves spatial information of the first color image at each stride of the semantic segmentation network, while the semantic segmentation network is trained, and
the context path preserves semantic context information of the first color image at each stride, while the semantic segmentation network is trained.

8. The system according to claim 1, wherein the circuitry is further configured to compute, at the auxiliary stride, the ground truth probability map as a multi-label probability distribution over the set of classes based on probability maps of a plurality of layers of the semantic segmentation network before the auxiliary layer.

9. The system according to claim 1, wherein the computed final cross-entropy loss is a histogram weighted soft-max cross-entropy loss.

10. The system according to claim 1, wherein the circuitry is further configured to:
estimate a global loss-measure for the semantic segmentation network based on the computed auxiliary cross-entropy loss and the computed final cross-entropy loss; and
train the semantic segmentation network further based on the estimated global loss-measure.

11. The system according to claim 10, wherein the training of the semantic segmentation network corresponds to update of weights for different layers of the semantic segmentation network till the estimated global loss-measure is a minimum.

12. The system according to claim 1, wherein the multi-class classification task corresponds to a classification of each pixel of the first color image into one of the set of classes.

13. The system according to claim 1, wherein the circuitry is further configured to:
input a second color image to the trained semantic segmentation network;
extract, from the output layer of the trained semantic segmentation network, a classification result for each pixel of the input second color image; and
generate a semantically segmented image comprising a set of regions filled with a corresponding set of colors based on the classification result,
wherein each region of the set of regions corresponds to a particular class of set of classes.

14. An electronic device, comprising:
a memory configured to store a semantic segmentation network pre-trained based on an auxiliary cross-entropy loss for an auxiliary layer of the semantic segmentation network and a final cross-entropy loss, wherein the final cross-entropy loss is based on a final score map extracted from an output layer of the semantic segmentation network, and
the final score map corresponds to an output of the semantic segmentation network for a color image; and
circuitry configured to:
input the color image to an input layer of the semantic segmentation network;
extract, from the output layer of the semantic segmentation network, a classification result for each pixel of the input color image; and
generate a semantically segmented image based on the extracted classification result, wherein
the semantically segmented image comprises a set of regions filled with a corresponding set of colors, and
each region of the set of regions corresponds to a particular class of a multi-class classification task.

15. A method, comprising:
inputting a first color image to an input layer of a semantic segmentation network for a multi-class classification task,
wherein the semantic segmentation network generates, at an auxiliary stride, a first feature map as an output of an auxiliary layer of the semantic segmentation network based on the input first color image, extracting the first feature map from the auxiliary layer;
computing a probability map as a set of soft labels over a set of classes of the multi-class classification task, based on the extracted first feature map;
computing an auxiliary cross-entropy loss between the computed probability map and a ground truth probability map for the auxiliary stride;
extracting a final score map from an output layer of the semantic segmentation network, wherein the final score map corresponds to an output of the semantic segmentation network for the first color image;
computing a final cross-entropy loss based on the extracted final score map; and
training the semantic segmentation network for the multi-class classification task based on the computed auxiliary cross-entropy loss and the computed final cross-entropy loss.

16. The method according to claim 15, further comprising computing, at the auxiliary stride, the ground truth probability map as a multi-label probability distribution over the set of classes based on probability maps of one or mom a plurality of layers of the semantic segmentation network before the auxiliary layer.

17. The method according to claim 15, further comprising:
estimating a global loss-measure for the semantic segmentation network based on the computed auxiliary cross-entropy loss and the computed final cross-entropy loss; and
training the semantic segmentation network on the multi-class classification task further based on the estimated global loss-measure.

18. The method according to claim 15, further comprising:
inputting a second color image to the trained semantic segmentation network;
extracting, from the output layer of the trained semantic segmentation network, the final score map as a classification result for each pixel of the input second color image; and generating a semantically segmented image comprising a set of regions filled with a corresponding set of colors based on the extracted final score map,
wherein each region of the set of regions corresponds to a particular class of set of classes.

* * * * *